United States Patent [19]

Sakurazawa

[11] 4,111,109
[45] Sep. 5, 1978

[54] WHEAT FLOUR PRODUCT MANUFACTURING EQUIPMENT

[76] Inventor: Hatuo Sakurazawa, 15 banchi, Sinozuka, Fujioka-shi, Gumna-ken, Japan

[21] Appl. No.: 715,684

[22] Filed: Aug. 19, 1976

[30] Foreign Application Priority Data

Aug. 21, 1975 [JP] Japan .................... 50-115729[U]

[51] Int. Cl.² ............................ A23L 3/00; A47J 37/12
[52] U.S. Cl. ............................ 99/353; 99/404; 99/407; 99/443 C; 425/294
[58] Field of Search ........................ 99/404, 339–355, 99/403, 407–408, 426–427, 432, 443, 450.1–450.4; 425/135, 199, 294, 329, 374

[56] References Cited

U.S. PATENT DOCUMENTS

| | | | |
|---|---|---|---|
| 719,116 | 1/1903 | Hueg | 425/374 X |
| 1,987,237 | 1/1935 | Lauterbur et al. | 425/374 X |
| 2,165,718 | 7/1939 | Mun | 425/294 X |
| 2,571,555 | 10/1951 | Fernandes | 99/443 C X |
| 2,714,861 | 8/1955 | Castronuovo | 99/450.2 X |
| 2,801,176 | 7/1957 | Ozai-Durrani | 99/443 C X |
| 3,608,474 | 9/1971 | Liepa | 99/407 X |
| 3,851,569 | 12/1974 | Madrid | 99/407 |
| 3,937,848 | 2/1976 | Campbell et al. | 99/407 X |

FOREIGN PATENT DOCUMENTS

| | | | |
|---|---|---|---|
| 309,466 | 1933 | Italy | 425/199 |
| 494,899 | 1954 | Italy | 425/294 |

Primary Examiner—Harvey C. Hornsby
Assistant Examiner—Arthur O. Henderson
Attorney, Agent, or Firm—Basile and Weintraub

[57] ABSTRACT

Wheat flour products are automatically manufactured with a compact rolling and shaping apparatus which comprises (a) vertically arranged rolling rollers having respective clearances slightly horizontally deviated or offset and having a slitter and cutter in the lower end part thereof, (b) a gelatinizing apparatus, (c) seasoning apparatus, (d) frying apparatus including an endless conveyor and (e) cooling apparatus, combining an endless conveyor and cooling means. The various stages are arranged in upper and lower steps or elevations. A basket carrying endless conveyor is utilized for conveyance between the roller stage, gelatinizing apparatus, seasoning apparatus and endless conveyor of the frying apparatus.

6 Claims, 4 Drawing Figures

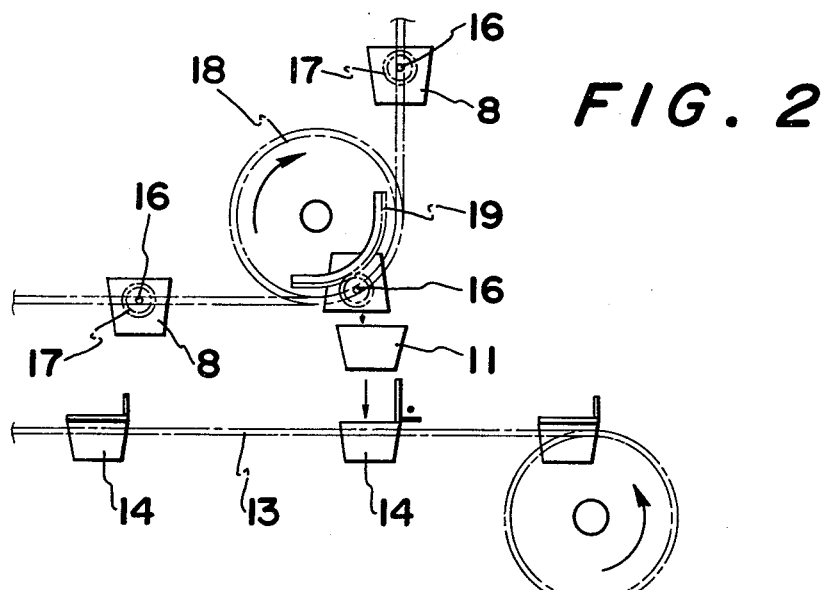
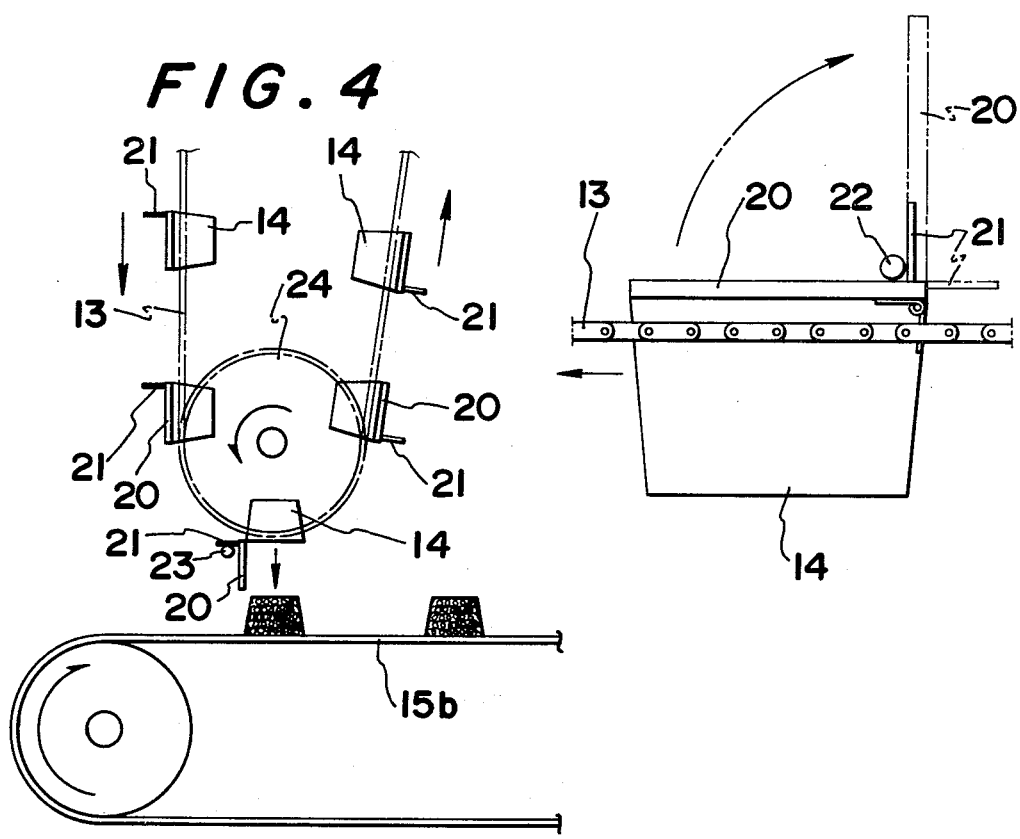

WHEAT FLOUR PRODUCT MANUFACTURING EQUIPMENT

BACKGROUND OF THE INVENTION

1. Field of the Invention

This invention relates to wheat flour product manufacturing equipment. More particularly, the present invention relates to an equipment for automatically manufacturing wheat flour products wherein various stages including a gelatinizing apparatus, seasoning apparatus, frying apparatus and drying apparatus arranged, generally, in upper and lower steps or elevations is continuously arranged with a vertical rolling apparatus.

2. Prior Art

The prior conventional wheat flour product manufacturing equipment of the kind under consideration herein has heretofore required a wide and large space to set up a rolling apparatus; finely cutting shaping apparatus; gelatinizing apparatus; seasoning apparatus, frying apparatus, and drying apparatus, which are conventional stages associated therewith. Particularly, these various apparatus stages cannot be arranged linearly due to the structure of the conveyor means interconnecting the stages. Therefore, the plant of this kind must be extremely long. Thus, there have been great problems in securing the requisite operation site and building conditions.

In the manufacture of such wheat flour products, it is, also, desirable to have equipment which operates sanitarily and efficiently, while eliminating manual operations as much as possible. However, in the case of such equipment consisting of a combination of various apparatus developed and set in the horizontal direction or extended and linearly arranged, as described above, the raw material wheat flour body will hang down. Thus, either a manual support and guiding operation or a special apparatus for supporting and guiding the raw material wheat flour is required. However, when a manual operation is employed, sanitation problems and a potential danger of the operator being injured by having the hand wound in the equipment occur. When special apparatus is used, the costs are exorbitant. These various problems are sought to be rectified by the present invention.

OBJECTS OF THE INVENTION

In view of the above described problems, an object of the present invention is to reduce the setting area of a wheat flour product manufacturing equipment.

Another object of the present invention is to provide an equipment wherein a raw material can be automatically fed in the step of forming a raw material wheat flour body and no manual operation is required.

A further object of the present invention is to provide an equipment which is sanitary and does not increase the cost.

SUMMARY OF THE INVENTION

The present invention includes in a part of its formation the invention of copending U.S. patent application Ser. No. 686,720, filed May 17, 1976, the disclosure of which is hereby incorporated by reference. As disclosed in the copending application, and as utilized herein the rolling rollers are vertically arranged with the rolling clearances, respectively, slightly horizontally offset or deviated so that the upper peripheral surface of one rolling roller may be below the rolling clearance between the rolling rollers set above it. In this manner a rolled band-shaped wheat flour body paid out of the rolling clearance between the upper rolling rollers can hang down into contact with the upper peripheral surface of the lower rolling roller and can be automatically fed into the rolling clearance by the rotation of the rolling roller with which the wheat flour body is in contact. This action is not seen in the conventional horizontal rolling apparatus.

Such rolling apparatus according to the present invention has a slitter which comprises a plurality of cutters, as in a shredding machine, to mesh many slits. A horizontal cutting machine cuts each finely cut wheat flour body to a fixed length. A waving apparatus waves the wheat flour bodies, as required, following the cutting machine, at the lowermost end of the rolling apparatus.

An endless bucket conveyor of known kind is employed herein and enters the gelatinizing apparatus. The gelatinizing apparatus humidifies and heats the wheat flour bodies with steam. From the gelatinizing apparatus the bucket conveyor carries the wheat bodies to the seasoning apparatus which contains a soup and which seasons the gelatinized wheat flour bodies by dipping the buckets in the soup. The seasoned wheat flour bodies in the buckets are transferred therefrom into buckets provided with lids on a second endless conveyor. The bodies are, then, fried by dipping the buckets in oil contained in the frying apparatus. Therefrom, the bodies are, then, transferred onto a third endless conveyor associated with the cooling apparatus. Therefrom, the bodies are, then, transferred onto a third endless conveyor associated with the cooling apparatus. Here the fried wheat flour bodies are cooled by being exposed to the wind of fans.

Particularly, in this processing line, the gelatinizing apparatus, seasoning apparatus, frying apparatus and cooling apparatus are arranged in any number of steps so as to be properly stacked above and below so that the setting area of the entire equipment can be greatly reduced, and which is, also, facilitated by the structure of the rolling apparatus.

As noted, such bulky apparatus as, for example, the gelatinizing apparatus, frying apparatus and cooling apparatus are mostly selected to be stacked above, and below, one another.

For a more complete understanding of the present invention, reference is made to the following detailed description and accompanying drawing. In the drawing like reference characters refer to like parts throughout the several views in which:

BRIEF DESCRIPTION OF THE DRAWINGS

FIG. 2 is a side elevational view showing the mechanism of tumbling buckets;

FIG. 3 is a magnified view of a bucket utilized in the bucket conveyor of the frying apparatus, and FIG. 4 is an elevational view showing wheat flour bodies being transferred from the bucket conveyor of the frying apparatus to an endless conveyor associated with the cooling apparatus.

DETAILED DESCRIPTION OF THE PREFERRED EMBODIMENT

Figure 1:
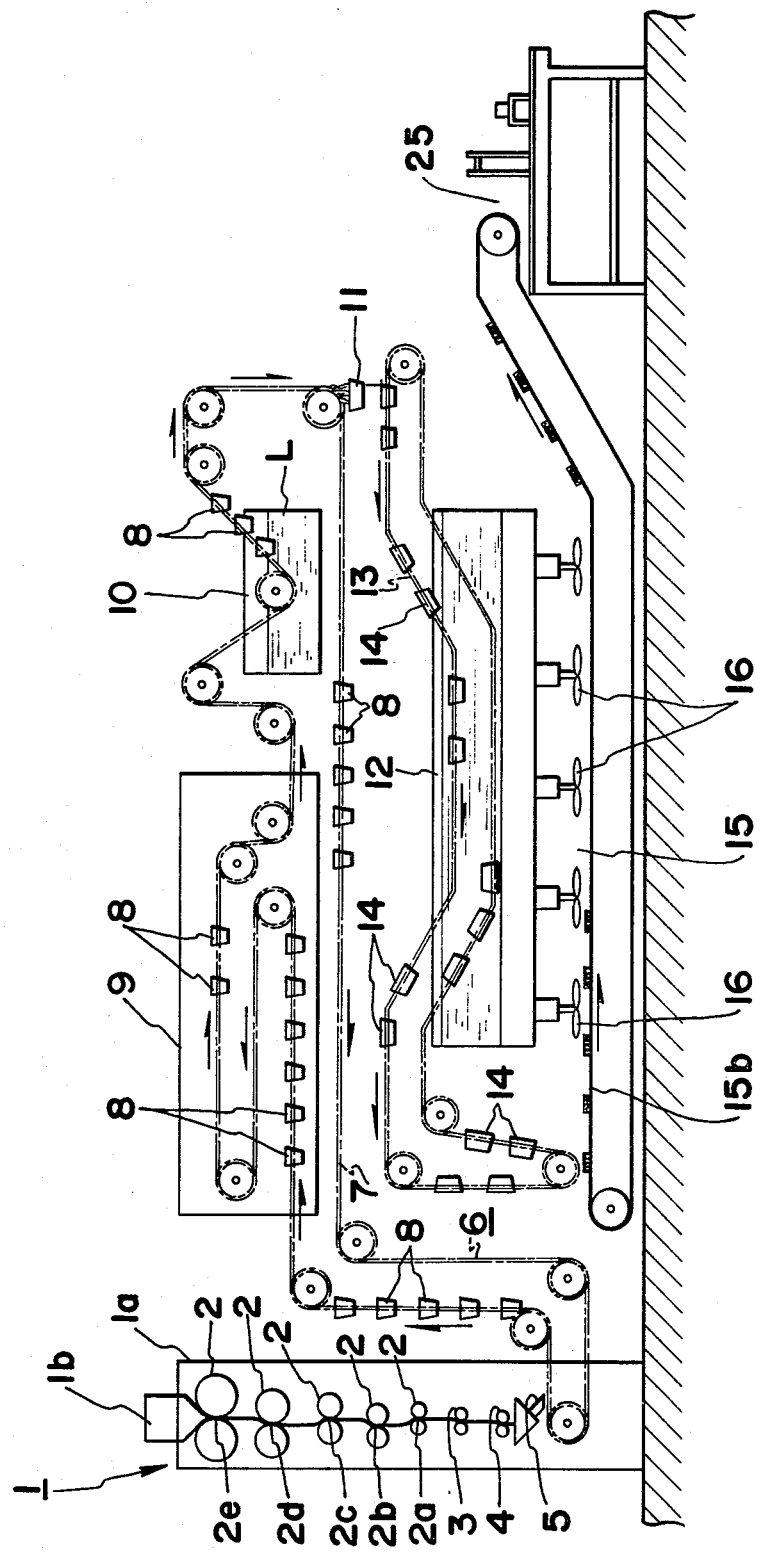
FIG. 1 is a schematic view showing systematically an embodiment of the present invention.

Now, and with reference to the drawing, a vertical rolling apparatus 1 is set on a floor. The rolling apparatus 1 comprises rolling rollers 2 arranged and mounted downward in the order from the upper larger diameter ones to the small diameter ones, in descending order. The rolling rollers 2 of any one set has the rolling clearance thereof offset or deviated in the horizontal direction from the position of the rolling clearance, between the rolling rollers mounted just above them. For example, the rollers 2 having roller clearance 2b has clearance 2b horizontally offset with respect to clearance 2c of rollers 2 immediately thereabove. Furthermore, the rolling clearances 2c, 2d and 2e between the respective rolling rollers 2 are, also, offset or deviated slightly in the horizontal direction so that the, respective, rolling rollers 2 have the peripheral surface of the rolling roller which is mounted immediately below located in the position of the vertical line from the rolling clearance.

The apparatus 1, also, comprises a feeding hopper 1b. In accordance herewith, a wheat flour material is inserted in the hopper 1b. The material is first rolled through the rolling clearance 2e between the uppermost rolling rollers 2; contacts the peripheral surface of the rolling roller 2 below; is guided into the rolling clearance 2d by the rotation of the rolling roller; is rolled there, and is applied in turn to the following rolling rollers in the same manner. A roll-type slitter 3 having a plurality of slits at regular intervals is provided in the lower end part of the rolling apparatus 1. A horizontal cutting machine 4 having projecting blades on the peripheral surfaces of rollers is provided just below said slitter.

The slitter 3 and horizontal cutting machine 4 are mounted, also, with their, respective, roll meeting parts deviated in the horizontal direction in the same manner as described with respect to the rollers 2.

The apparatus 1, also, comprises a waving apparatus 5 for waving wheat flour bodies. The apparatus 5 has a delivering port at the tip which is formed to be smaller than the feeding side thereabove. This imparts a frictional resistance to the delivery of the wheat flour bodies and the feeding is made faster than the delivery to thereby bend and wave the wheat flour bodies.

An endless bucket conveyor 6 is disposed below the delivery port of the waving apparatus 5. The conveyor 6 has a plurality of buckets 8 pivotally mounted thereonto through trunnions 16. The buckets 8 are mounted at regular intervals on the conveyor 6. The wheat flour bodies are transferred from the rolling apparatus 1 into the buckets 8 on the bucket conveyor 6.

A gelatinizing apparatus 9 and a seasoning apparatus 10 are arranged in the uppermost elevation or step adjacent the side of the rolling apparatus 1. A frying apparatus 12 is set below the gelatinizing apparatus 9 and seasoning apparatus 10, and a cooling apparatus 15 is set below the frying apparatus 12. Thus, the various stages utilized herein are stepped or elevated with relationship to one another, to compact space.

The gelatinizing apparatus 9 is filled with heated steam so that, when the buckets 8 pass through said apparatus, the wheat flour bodies contained in the buckets may be humidified and warmed by contact with the steam. The temperature is kept at about 100° C. for 3 minutes during which the buckets 8 pass through the gelatinizing apparatus 9.

The gelatinizing wheat flour bodies are then transferred into the seasoning apparatus 10 and are dipped, while contained in the buckets, into a soup L. The bucket conveyor 6 emerges from the seasoning apparatus 10, passes below it and the gelatinizing apparatus 9 and returns to the lower end of the rolling apparatus 1. On the way of its travel, and by means as is shown in FIG. 2, the buckets 8 are tumbled upside down so that the wheat flour bodies contained in them may be transferred into buckets 14 on an endless bucket conveyor 13 associated with the frying apparatus 12 through a hopper 11.

As shown in FIG. 2, a pinion 17 is fixed to the trunnion 16 supporting the bucket 8. This permits the buckets 8 to be rotated by a sprocket 18 in mesh with an arcuate rack 19 provided in the part in which the endless conveyor 13 turns from the vertical direction to the horizontal direction. The cooperation between the rack 19 and sprocket 18 rotates the bucket 8 through the trunnion 16, as the pinion meshes with the rack.

Each bucket 14 on the endless bucket conveyor 13 of the frying apparatus 12 is integrally fitted to the endless conveyor 13. Each bucket has a lid 20 which is pivoted to the bucket 14 on one side. Each lid is always biassed or energized to the closing direction and comprises a pawl 21 made to rise outside so as to make an angle of 90 degrees with the lid 20 through its pivot. As shown in FIG. 3, the pawl 21 is engaged by a separately mounted pin 22 so as to fall with the progress of the bucket. In this manner the lid 20 will open when the bucket 14 is positioned just below the hopper 11 and will be automatically closed by the disengagement of the pawl 21 with the pin 22 when the bucket 14 moves toward the frying apparatus in the direction of travel of the conveyor.

The wheat flour bodies as contained in the buckets 14 covered with the lids are dipped and fried in the oil in the frying apparatus 12.

The buckets 14 are pulled out of the frying apparatus 12 by the endless conveyor 13 and the fried wheat flour bodies in the buckets are transferred onto an endless belt 15b associated with the cooling apparatus 15 below the frying apparatus 12. In FIG. 4 there is shown a mechanism for opening the lids in such case. As the buckets 14 are fixed to the endless conveyor 13, they naturally tumble at a sprocket 24 and a separately fixed pin 23 simultaneously pushes the pawls 21 down to open the lids 20. The wheat flour products fried in the form of blocks drop onto the endless conveyor belt 15b from the buckets 14 and are cooled while passing below fans 15a.

As shown in FIG. 1 the present invention, also, comprises a packing apparatus 25, into which product is delivered from the cooling apparatus via conveyor 15b.

Having, thus, described the invention, what is claimed is:

1. A wheat flour product manufacturing equipment comprising, in combination:
    (a) a vertical rolling apparatus comprising a plurality of sets of vertically arranged rolling rollers, each of the sets having a rolling clearance between the rollers thereof, the rolling rollers of any one set having the rolling clearance thereof offset in the horizontal direction from the rolling clearance of the set of rolling rollers immediately thereabove.
    (b) a gelatinizing apparatus,
    (c) a seasoning apparatus,
    (d) a frying apparatus,
    (e) a cooling apparatus, (f) a first endless conveyor having a plurality of trunnion-mounted buckets disposed thereon, the first conveyor transported product received from the rolling apparatus to the gelatinizing apparatus and the seasoning apparatus, (g) a second endless conveyor for transporting product from the seasoning apparatus to the frying apparatus, the second endless conveyor having buckets affixed thereonto in which product is received from the first conveyor, each bucket having a lid, (h) means for opening each lid as it receives product from the buckets of the first conveyor, the means closing the lids as the buckets travel through the frying apparatus and means for re-opening the lids as the buckets approach the cooling apparatus, the means for opening and closing the lids being located adjacent the path of the second conveyor so as to be contacted by means carried on the lids, (i) a third endless conveyor for receiving the product from the opened bucket for transporting product from the frying apparatus to the cooling apparatus, and wherein the gelatinizing apparatus and seasoning apparatus are elevated above the frying apparatus and the cooling apparatus is disposed below the frying apparatus.

2. The combination of claim 1 wherein:
the rolling apparatus further comprises:
(a) a slitter for cutting the product disposed near the bottom of the apparatus, and
(b) a wave former having an inlet and an outlet, the inlet having a larger opening than the outlet to cause the product to wave, the outlet communicating with the buckets of the first conveyor to issue product thereinto, the inlet communicating with the slitter to drop product into the wave former.

3. The combination of claim 1 wherein the means for opening the lid comprises:

(a) a pivotally mounted pawl affixed to each lid on the exterior thereof, the pawl being substantially perpendicular to the lid and being biassed to urge the lid to closing and (b) a pin associated with the second conveyor at a first end thereof whereat the product is transferred from the first conveyor to the buckets of the second conveyor, the pin engaging the pawl and acting thereupon to rotate the pawl to open the lid, the disengagment of the pin from the pawl causing the lid to close.

4. The combination of claim 1 wherein the means for reopening the lid comprises:

a second pin associated with the second endless conveyor, the second pin being disposed proximate the area of transfer of product from the second conveyor to the third conveyor, the pin engaging the pawl to open the lid against the bias thereof.

5. The combination of claim 1 which further comprises:

means for tumbling the buckets of the first conveyor into the buckets of the second conveyor, the means comprising:
(a) a sprocket about which the conveyor travels,
(b) an arcuate rack disposed at the point at which the path of travel of the conveyor changes from a vertical direction to a horizontal direction;
(c) a pinion fixedly mounted to the trunnion of each bucket, the pinion meshing with the rack to tumble the bucket to drop product therefrom into a hopper disposed immediately therebelow, the hopper issuing product into the buckets of the second conveyor.

6. The combination of claim 1 which further comprises:

a packing apparatus for packing cooled product, the product being delivered to the packing apparatus from the cooling apparatus by the third endless conveyor.

* * * * *